July 28, 1936.  I. W. ROBERTSON  2,049,024
OSCILLATING JOINT
Filed Feb. 1, 1932  2 Sheets-Sheet 1
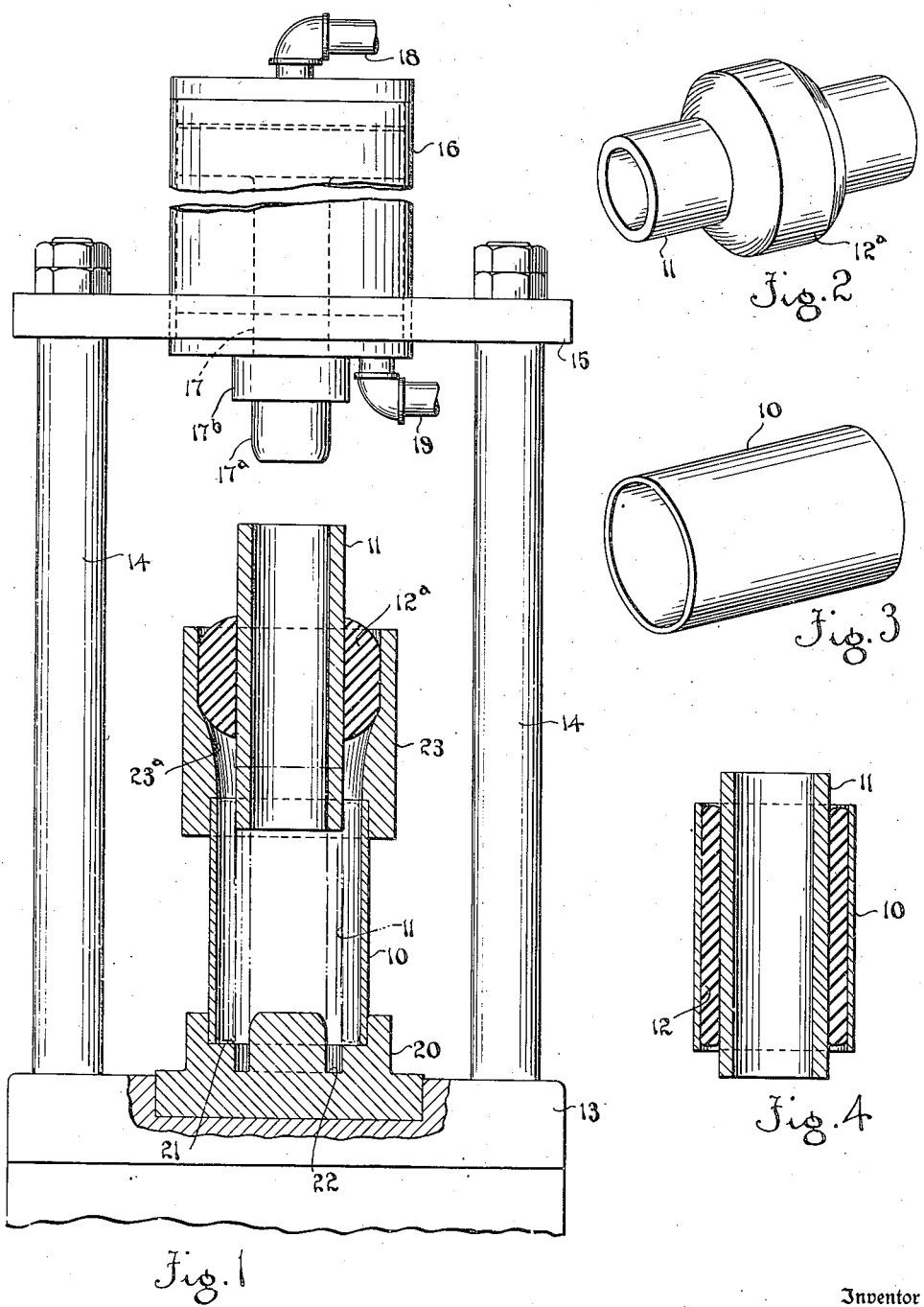
Inventor
Isaac W. Robertson
By Ely & Barrow
Attorneys July 28, 1936.                I. W. ROBERTSON                2,049,024
                               OSCILLATING JOINT
                          Filed Feb. 1, 1932        2 Sheets-Sheet 2

INVENTOR
Isaac W. Robertson
Ely Barrow
ATTORNEYS

Patented July 28, 1936

2,049,024

UNITED STATES PATENT OFFICE 2,049,024

OSCILLATING JOINT

Isaac W. Robertson, Akron, Ohio, assignor to The Firestone Tire & Rubber Company, Akron, Ohio, a corporation of Ohio Application February 1, 1932, Serial No. 590,206

9 Claims. (Cl. 287—85)

This invention relates to oscillating joints such as are used, for example, in automobile construction for the joints formed between the springs and shackle bolts, and the joints involved in the steering mechanism, and more especially the invention relates to oscillating joints of the type comprising rubber mounted between concentric connecting members, such as an outer sleeve and an inner sleeve or shackle bolt.

In oscillating joints of the character mentioned wherein relative angular movement of the sleeves is resisted by the tension of the rubber, the rubber either has been vulcanized to the respective sleeves, or it has been compressed between the sleeves so as to engage the latter strongly by friction. Vulcanizing the rubber within the sleeves is a difficult and frequently unsatisfactory operation, and where the rubber engages the sleeves solely by friction there is such a difference in area between the rubber-engaging surfaces of the inner and outer sleeves that slippage invariably occurs between the rubber and inner sleeve, and before the sleeves have turned relatively of each other a satisfactory distance.

The chief objects of the invention are to facilitate the assembling of the outer sleeve and the inner sleeve or bolt and rubber in the manufacture of oscillating joints of the character described; to avoid vulcanizing the rubber at least to one of the sleeves; and to assure substantial relative angular movement of the sleeves before slippage upon the rubber occurs. Other objects will be manifest as the specification proceeds.

Of the accompanying drawings:

Figure 1 is an elevation of apparatus for the manufacture of my improved joint, and the work therein, the latter and a part of the apparatus being shown in section;

Figure 2 is a perspective view of the inner sleeve and rubber cushion of the improved joint, as they appear before assembly with the outer sleeve;

Figure 3 is a perspective view of the outer sleeve;

Figure 4 is a longitudinal section through the assembly;

Figure 5:
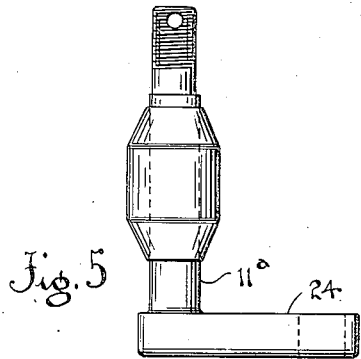
Figure 5 is an elevation of a modified form of construction employing an integral bolt and shackle instead of the inner sleeve.

Referring to Figure 4 of the drawings, the improved oscillating joint comprises a metal outer sleeve 10, a concentric metal inner sleeve 11, and an intervening cushion of elastic rubber 12. In the modified forms shown in Figures 5, 7 and 9, a shackle bolt or other type of bar 11a, 11b or 11c, respectively, is substituted for the metal inner sleeve, as will be later described. The following description of the construction and assembly of the joint refers to inner sleeve 11 but it will be understood that the same construction and assembly are applicable to the bolt or bar. The rubber cushion 12 is locally adhesively attached or bonded, preferably by vulcanization, to the inner sleeve 11 in the central region thereof, and, in assembled form, is under compression so as to exert strong pressure against both the inner and outer sleeves.

The inner sleeve 11 as shown is longer than the outer sleeve 10, but the sleeves may be of the same length if desired.

In the manufacture of the joint, a collar of rubber 12a is molded and vulcanized onto the inner sleeve 11, centrally thereof, said rubber collar being of less length than the sleeves 10, 11 and of greater diameter than the inside diameter of the outer sleeve 10 and having convex lateral faces as shown. The sleeve 11 and rubber collar 12a thereon are assembled with the outer sleeve 10 by forcing the sleeve 11 into telescoped relation with the sleeve 10, the rubber collar 12a being thereby carried into the outer sleeve, and so deformed and displaced as to fill completely the space between the inner and outer sleeves, as is most clearly shown in Figure 4.

Suitable apparatus for assembling the members of the joint is shown in Figure 1 wherein 13 is a base, 14, 14 are posts rising therefrom, 15 is a deck or support mounted upon the posts 14, and 16 is a double acting fluid pressure operated cylinder mounted upon the deck 15, the cylinder 16 being vertically positioned and having a piston rod 17 projecting downwardly from its lower end. The cylinder 16 is provided at its opposite ends with fluid inlet and outlet pipes 18, 19 and the lower end of the piston rod 17 is formed with a tapered leader or guide 17ª adapted to enter the sleeve 11 at an end thereof, and a collar 17ᵇ of larger diameter adapted to overlie said end. A suitable work-seat 20 is mounted upon the base 13, said work-seat being formed with an annular recess 21 that is axially aligned with the piston rod 17 and adapted to receive an end portion of the outer sleeve 10, and having a concentric groove 22 of smaller diameter adapted to receive the leading end portion of the inner sleeve 11 when the latter is fully telescoped with the outer sleeve 10. It will be understood that groove 22 will be modified by a recess (not shown) provided when assembling the form of joint shown in Figure 6 in order to accommodate bolt 11ª.

A suitable tubular guide 23 is provided for facilitating the forcing of the rubber collar 12ª into the outer sleeve 10, said guide being adapted to be mounted upon the upper end of the sleeve 10, and being interiorly formed with a downwardly tapered portion 23ª having a large diameter of the same size as the normal diameter of the collar 12ª, and having a small diameter of the same size as the inside diameter of the sleeve 10.

In the operation of the apparatus, the piston rod 17 being in its raised or retracted position, a sleeve 10 is mounted in the recess 21 of the work support 20, the guide 23, preferably with its tapered portion 23ª suitably lubricated, is mounted upon the upper end of the sleeve 10, and the assembly comprising the sleeve 11 and rubber collar 12ª is mounted in the upper end of the guide 23, as clearly shown in Figure 1. The upper end of the cylinder 16 is then charged to project the piston rod 17 downwardly whereby it engages the upper end of the sleeve 11 and forces the sleeve into telescoped engagement with the sleeve 10, the rubber collar 12ª being thereby deformed and displaced so as completely to fill the space between the two sleeves, and placed under compression, as previously described.

The vulcanizing of the collar 12ª upon the exterior of the inner sleeve 11 is a relatively simple operation, and also it facilitates the insertion of the collar into the sleeve 10, as does the feature of the convex lateral faces of the collar.

Figure 6:
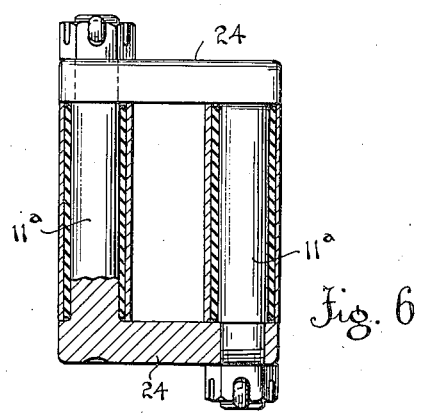
Figure 6 is a longitudinal section through a spring shackle assembly including a pair of the elements illustrated in Figure 5.
Figure 7:
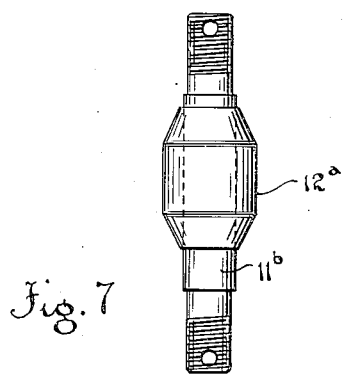
Figure 7 is an elevation of a second modified form of construction employing a bolt instead of the inner sleeve.
Figure 8:
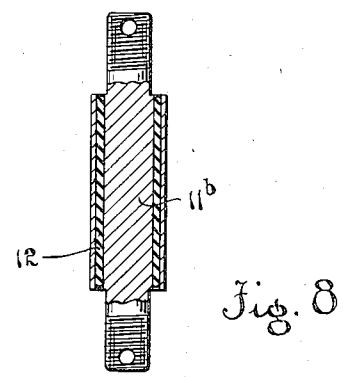
Figure 8 is a longitudinal section through an assembled joint employing the inner member shown in Figure 7.

In the modified form of construction shown in Figures 5 and 6 the bolt 11ª is formed integral with the shackle or strap 24, a pair of these members, when assembled with outer sleeves 10, forming a complete spring shackle as shown in Figure 6. In Figures 7 and 8 a solid bar 11ᵇ has been substituted for the sleeve 11 shown in Figure 4, the rubber cushion 12ª being bonded to the bar.

Figure 9:
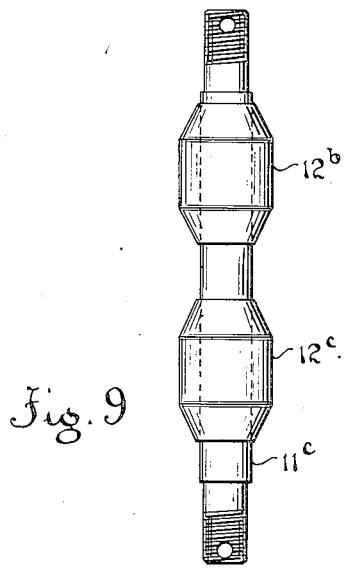
Figure 9 is a perspective view of a third modified form of the inner member and rubber cushion.
Figure 10:
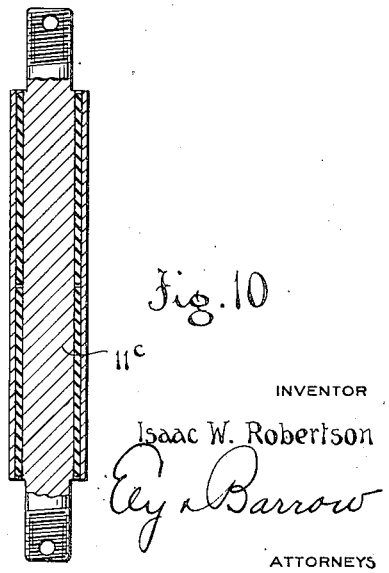
Figure 10 is a longitudinal section through an assembled joint employing the inner member shown in Figure 9.

If it is desired to distribute distortion of the rubber cushion, two or more rubber cushions 12ᵇ and 12ᶜ may be attached to the bar 11ᶜ illustrated in Figures 9 and 10.

The rubber cushion 12 being under compression, bears strongly against both inner and outer sleeves, thereby assuring that substantial relative angular movement of the sleeves may be had, against the torsional strain of the rubber cushion, before there is any slippage between the cushion and the sleeves. The pressure of the cushion 12 against the inner sleeve relieves the vulcanized bond therebetween of some of the torque incidental to the use of the joint, and the combination of the bond and friction between the inner sleeve and cushion provides greater resistance to relative movement between said members than is present between the cushion and the outer sleeve 10 where friction alone resists relative angular movement of the said members. Thus when slippage occurs, it is always between the outer sleeve 10 and the rubber cushion 12, and, because of the greater surface area of the sleeve 10 as compared to the sleeve 11, such slippage occurs after greater relative angular movement of the sleeves than would be the case if the cushion was not vulcanized to the inner sleeve 11.

Modification may be resorted to within the scope of the appended claims, which are not limited wholly to the specific construction shown or exact procedure described.

What is claimed is:

1. A rubber articulated joint comprising an inner metallic member and outer metallic member surrounding the inner metallic member and spaced therefrom, and a rubber sleeve held in space between said metallic members in the condition of substantial mass tension, a portion of said sleeve secured to said inner member by vulcanization, and a portion by a frictional bond, said rubber sleeve being secured to said outer member solely by frictional bond.

2. A rubber articulated joint comprising an inner metallic member and outer metallic member surrounding the inner metallic member and spaced therefrom, and a rubber sleeve held in the condition of substantial mass tension in said space, said rubber sleeve being secured to said inner and outer metallic members by means of a frictional bond, a central area of said rubber sleeve further bonded to said inner metallic member by means of vulcanization.

3. A rubber articulated joint comprising an inner metallic member and an outer metallic member surrounding the inner metallic member and spaced therefrom, and a rubber sleeve held in the space between said metallic members in a condition of substantial mass tension, a portion of said sleeve secured to at least one of said members by vulcanization and upon at least one side thereof by a frictional bond only, said rubber sleeve being secured to the other of said members at least by a frictional bond.

4. A rubber articulated joint comprising an inner metallic member and an outer metallic member surrounding the inner metallic member and spaced therefrom, and a rubber sleeve held in the space between said metallic members in a condition of substantial mass tension, a portion of said sleeve secured to at least one of said members by vulcanization and upon portions at both sides thereof by a frictional bond only, said rubber sleeve being secured to the other of said members at least by a frictional bond.

5. An oscillating joint comprising an outer sleeve, an inner member, and a cushion of resilient rubber under compression therebetween, said cushion engaging the outer sleeve solely by friction, and being locally adhesively vulcanized to the inner member in the central region only thereof.

6. An oscillating joint comprising an outer tubular sleeve, an inner member of smaller diameter concentric therewith, and an intervening cushion of rubber, said rubber being vulcanized to the central portion of said inner member, the rubber cushion at the sides of the vulcanized area frictionally engaging said inner member.

7. An oscillating joint comprising an outer sleeve, an inner member, and a plurality of annular cushions of resilient rubber under radial compression therebetween, said cushions being axially disposed along said inner member and adhesively attached thereto and being normally spaced apart, said radial compression distorting said rubber cushions in axial directions whereby they substantially fill the spaces therebetween, the distorted portions of the rubber members engaging the inner member frictionally between the areas of adhesion of the rubber members to said inner member.

8. An oscillating joint comprising an outer sleeve, a bolt concentrically disposed therein and spaced therefrom, and an annular rubber cushion bridging the space between the bolt and outer sleeve, the radially inner portion of said cushion being secured at its central portion through a vulcanized union with the bolt and being secured at the portion on at least one side of said central portion by a frictional engagement with the bolt.

9. An oscillating joint comprising an outer sleeve, an inner member, and a plurality of annular cushions of resilient rubber under radial compression therebetween, said annular cushions being adhesively bonded to said inner member in annular areas substantially narrower than the areas of contact of said rubber cushions after they have been distorted by said radial compression during the assembling of the joint, the rubber cushions contacting the inner member solely by frictional engagement in the areas between said bonded areas, the radially outer portions of said cushions contacting the outer sleeve solely by frictional engagement.

ISAAC W. ROBERTSON.